United States Patent
Nishimoto

(10) Patent No.: US 6,353,516 B2
(45) Date of Patent: Mar. 5, 2002

(54) DISK APPARATUS HAVING MAGNETIC HEAD LIFTING DEVICE

(75) Inventor: Hideki Nishimoto, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,084

(22) Filed: Aug. 10, 1998

(30) Foreign Application Priority Data

Feb. 25, 1998 (JP) .......................... 10-043116

(51) Int. Cl.$^7$ ................................ G11B 5/54
(52) U.S. Cl. .................................. 360/255.2
(58) Field of Search ................... 360/99.02, 99.06, 360/105, 254.1, 255.2; 369/13

(56) References Cited

U.S. PATENT DOCUMENTS

| | | | | |
|---|---|---|---|---|
| 4,722,012 A | * | 1/1988 | Toldi et al. | 360/105 X |
| 5,222,005 A | * | 6/1993 | Inoue | 360/99.06 |
| 5,303,102 A | * | 4/1994 | Aruga et al. | 360/254.1 |
| 5,790,497 A | * | 8/1998 | Hayashi et al. | 360/99.06 X |
| 5,815,344 A | * | 9/1998 | Aoki | 360/99.06 |
| 6,088,203 A | * | 7/2000 | Nakamura et al. | 360/255.2 |

FOREIGN PATENT DOCUMENTS

| | | | |
|---|---|---|---|
| JP | 62-283447 | * | 12/1987 |
| JP | 3-288347 | * | 12/1991 |
| JP | 10-261278 | | 9/1998 |

* cited by examiner

Primary Examiner—George J. Letscher
(74) Attorney, Agent, or Firm—Greer, Burns & Crain, Ltd.

(57) ABSTRACT

A disk drive adapted to accept and eject a disk cartridge accommodating a disk includes a carriage movable in a radial direction of the disk, a magnetic head assembly mounted on the carriage and having a magnetic head, and a cartridge ejecting mechanism for ejecting the disk cartridge from the disk drive. The disk drive further includes a magnetic head lifter pivotally movable between a first position where the magnetic head lifter is engaged with the magnetic head assembly to lift the magnetic head from the disk when the disk cartridge is not inserted in the disk drive and a second position where the magnetic head lifter is pushed by the disk cartridge to gradually disengage from the magnetic head assembly and allow contact of the magnetic head with the disk when the disk cartridge is inserted into the disk drive.

18 Claims, 18 Drawing Sheets

DISK APPARATUS HAVING MAGNETIC HEAD LIFTING DEVICE

BACKGROUND OF THE INVENTION

1. Field of the Invention

The present invention relates generally to a disk drive, and more particularly to a magneto-optical disk drive having an optical head and a magnetic head.

2. Description of the Related Art

Increasing recording density in a magneto-optical disk drive has been progressively required as various systems for information recording have been developed. According to an optical modulation system adopted by the ISO standard, a laser beam is modulated with recording data while an external magnetic field is applied in a fixed direction, thereby recording information on a magneto-optical recording medium. In this optical modulation system, information recording density is limited by the size of a beam spot on the magneto-optical recording medium.

In contrast therewith, according to a magnetic field modulation system, an external magnetic field is modulated with recording data while a laser beam having a fixed intensity is directed onto a magneto-optical recording medium. In this magnetic field modulation system, beam spots can be overlapped on the magneto-optical recording medium. This system is considered to be more advantageous for high-density recording than the optical modulation system. Since the external magnetic field is modulated with the recording data at a high speed in the magnetic field modulation system, a flying magnetic head is used as a magnetic head in this system. The flying magnetic head used in this system is substantially the same in shape and operation principle as that used in a magnetic disk drive. When a magneto-optical disk as the magneto-optical recording medium is rotated, the magnetic head flies from the surface of the disk at a height of about 10 $\mu$m to record data in a beam spot.

In using a magneto-optical disk drive, it is essential to exchange disks. Accordingly, the magneto-optical disk drive is required to have a mechanism for loading and unloading a disk, wherein when ejecting the disk from the disk drive, a magnetic head is lifted about several millimeters from the disk, that is, unloaded for the purpose of preventing damage to the magnetic head. When inserting the disk into the disk drive, the magnetic head is lowered to the disk, that is, loaded. In a conventional mechanism as described in Japanese Patent Laid-open No. 6-215435, a member for lifting a suspension on which a magnetic head is mounted is retracted from a lift position in concert with an operation of inserting/ejecting a disk into/from a disk drive.

Such conventional mechanisms will now be described with reference to FIGS. 1A and 1B. In the conventional mechanism shown in FIG. 1A, a magnetic head assembly 2 includes a suspension 4 and a magnetic head 6 mounted on a front end portion of the suspension 4. Reference numeral 8 denotes a suspension lifting member. The suspension lifting member 8 is moved from a lift position shown in the direction of an arrow A, that is, in a direction perpendicular to the longitudinal direction of the suspension 4, thereby allowing contact of the magnetic head 6 with a disk (not shown) by a spring force of the suspension 4.

In the conventional mechanism shown in FIG. 1B, a suspension lifting member 10 is moved in the direction of an arrow B, that is, in a direction perpendicular to a disk 12, thereby allowing contact of the magnetic head 6 with the disk 12 by a spring force of the suspension 4. In such a conventional magneto-optical disk drive, the suspension lifting member 8 or 10 is moved or released in the direction A shown in FIG. 1A or in the direction B shown in FIG. 1B in making contact of the magnetic head 6 and the disk. Accordingly, at the moment the suspension lifting member 8 or 10 is released, the suspension 4 is returned by its own spring force toward the disk surface, causing a possibility of striking of the magnetic head 6 against the disk surface to damage the disk or the magnetic head.

In another aspect, the magnetic field modulation type magneto-optical disk drive adopts a contact start and stop (CSS) system wherein a disk starts rotating after a magnetic head comes into contact with the disk. Accordingly, a spindle motor for rotating the disk is required to exert a starting torque overcoming a static frictional force between the magnetic head and the disk, hindering attempts to reduce the size of the motor. Further, in the disk drive disclosed in Japanese Patent Laid-open No. 6-215435, a solenoid is energized only during ejection of a disk cartridge from the disk drive to lift the magnetic head from the disk. However, after the eject operation of the disk cartridge is ended, the magnetic head is returned to its original position, so that it is necessary to provide means for detecting an operation of subsequently inserted or loading disk cartridge into the disk drive and for lifting the magnetic head again. Thus, the configuration of the disk drive is complicated.

SUMMARY OF THE INVENTION

It is therefore an object of the present invention to provide a disk drive having a simple mechanism for loading and unloading a magnetic head with respect to a disk without damaging the disk and the magnetic head.

It is another object of the present invention to provide a disk drive which can reduce a static frictional force between a magnetic head and a disk to thereby reduce a load to a spindle motor.

It is a further object of the present invention to provide a disk drive having a mechanism for keeping a magnetic head lifted after ejecting a disk cartridge from the disk drive.

In accordance with an aspect of the present invention, there is provided a disk drive adapted to accept and eject a disk cartridge accommodating a disk, comprising a drive base; a carriage mounted on said drive base so as to be movable in a radial direction of said disk; driving means for moving said carriage; a magnetic head assembly mounted on said carriage and having a magnetic head; cartridge ejecting means having an eject arm pivotally moving in a first direction when said disk cartridge is inserted into said disk drive, while pivotally moving in a second direction opposite to said first direction when said disk cartridge is ejected from said disk drive; and a magnetic head lifter pivotally movable between a first position where said magnetic head lifter is engaged with said magnetic head assembly to lift said magnetic head and a second position where said magnetic head lifter is pushed by an insertion force of said disk cartridge inserted into said disk drive to allow contact of said magnetic head with said disk.

Preferably, the magnetic head assembly includes a suspension and the magnetic head supported at a front end portion of the suspension. The magnetic head lifter selectively engages the suspension to lift the magnetic head at the first position. Preferably, the magnetic head lifter is pivotally movable by a coil spring. More preferably, the magnetic head lifter is integrally formed with the coil spring. Preferably, the selective lifting of the magnetic head by the magnetic head lifter is performed at an outermost or innermost circumferential portion of the disk.

In accordance with another aspect of the present invention, there is provided a disk drive adapted to accept and eject a disk cartridge accommodating a disk, comprising a drive base; a carriage mounted on said drive base so as to be movable in a radial direction of said disk; driving means for moving said carriage; a magnetic head assembly mounted on said carriage and having a magnetic head; a magnetic head lifter movable between a first position where said magnetic head lifter is engaged with said magnetic head assembly to lift said magnetic head and a second position where said magnetic head lifter is disengaged from said magnetic head assembly; biasing means for moving said magnetic head lifter to said first position; and a solenoid for moving said magnetic head lifter to said second position against a biasing force of said biasing means.

In accordance with a further aspect of the present invention, there is provided a disk drive adapted to accept and eject a disk cartridge accommodating a disk, comprising a drive base; a carriage mounted on said drive base so as to be movable in a radial direction of said disk; driving means for moving said carriage; a head arm fixed to said carriage; a suspension fixed at its base end portion to said head arm; a magnetic head mounted on a front end portion of said suspension; a permanent magnet fixed to said suspension; and a solenoid provided so as to be opposed to said permanent magnet, for attracting said permanent magnet by passing a current in a first direction and repelling said permanent magnet by passing a current in a second direction opposite to said first direction.

Preferably, the disk drive further comprises control means for controlling said solenoid so that when said disk drive is powered off, a current is instantaneously passed through said solenoid in said first direction to attract said permanent magnet to said solenoid, whereas only when said disk cartridge is inserted into said disk drive and said disk drive is powered on, a current is instantaneously passed through said solenoid in said second direction to repel said permanent magnet from said solenoid.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1A:
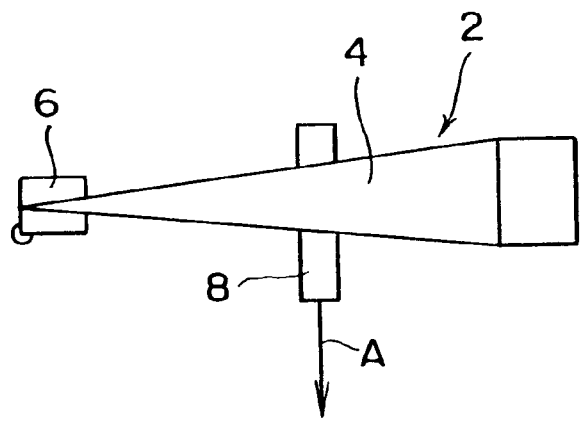
FIGS. 1A and 1B are plan and side views, respectively, showing different magnetic head loading and unloading mechanisms in the prior art.
Figure 1B:
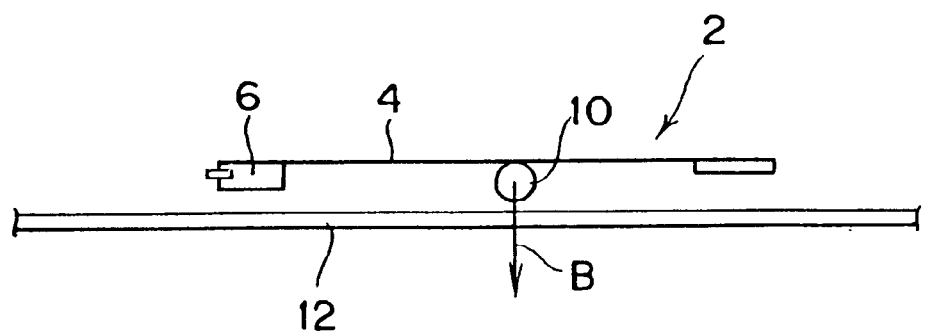

Some preferred embodiments of the present invention will now be described with reference to the attached drawings. In all the preferred embodiments, substantially the same parts will be denoted by the same reference numerals.

Figure 2:
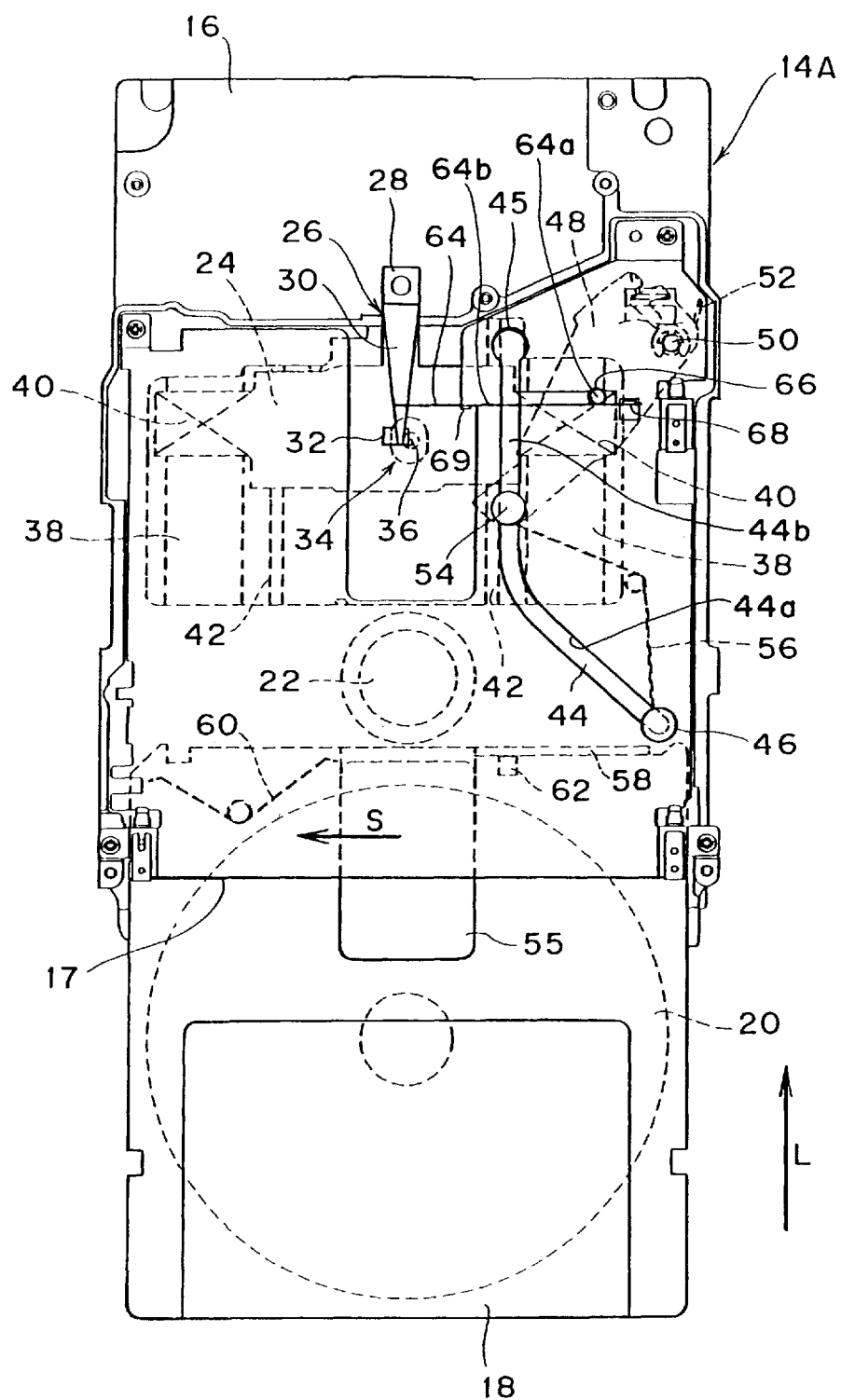
FIG. 2 is a plan view of a disk drive according to a first preferred embodiment of the present invention in a condition where a disk cartridge has started to be inserted into the disk drive.
Figure 3:
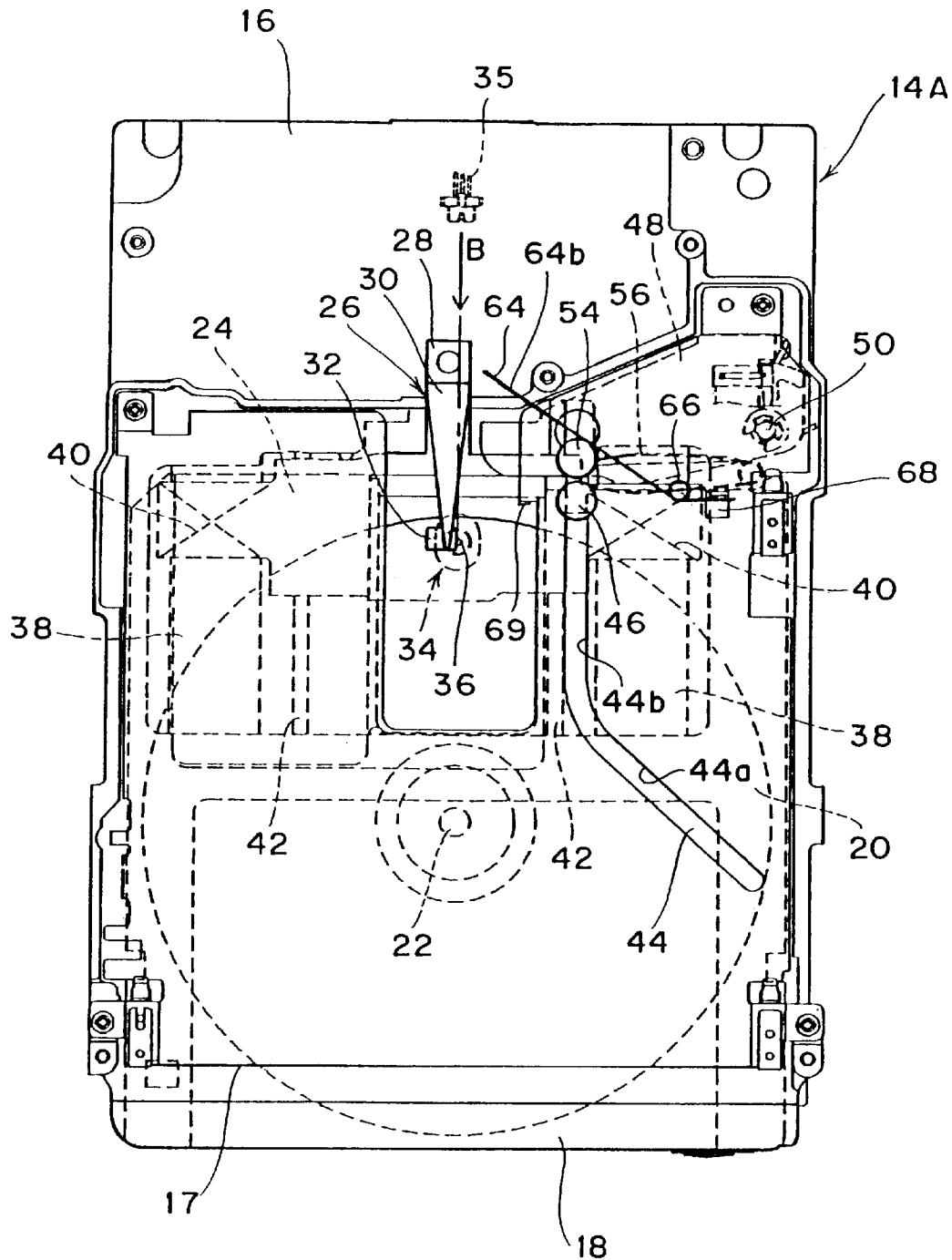
FIG. 3 is a view similar to FIG. 2, showing a condition where the disk cartridge has been fully inserted in the disk drive.

Referring to FIGS. 2 and 3, there are shown plan views of a magneto-optical disk drive 14A according to a first preferred embodiment of the present invention. FIG. 2 shows a condition where a magneto-optical disk cartridge 18 has started to be inserted into the magneto-optical disk drive 14A, and FIG. 3 shows a condition where the magneto-optical disk cartridge 18 has been fully inserted or loaded in the magneto-optical disk drive 14A.

A magneto-optical disk 20 is accommodated in the cartridge 18. Reference numeral 16 denotes a drive base or disk enclosure of the magneto-optical disk drive 14A. A pair of magnetic circuits 38, a pair of guide rails 42, a semiconductor laser 35, etc. are mounted on the drive base 16. Reference numeral 24 denotes a carriage carrying an optical head 34 having an objective lens 36. The carriage 24 is provided with a pair of coils 40 at positions corresponding to the magnetic circuits 38. The magnetic circuits 38 and the coils 40 constitute a voice coil motor (VCM). By passing a current through the coils 40, the carriage 24 is moved in the radial direction of a the magneto-optical disk 20 as being guided by the pair of guide rails 42.

Figure 4:
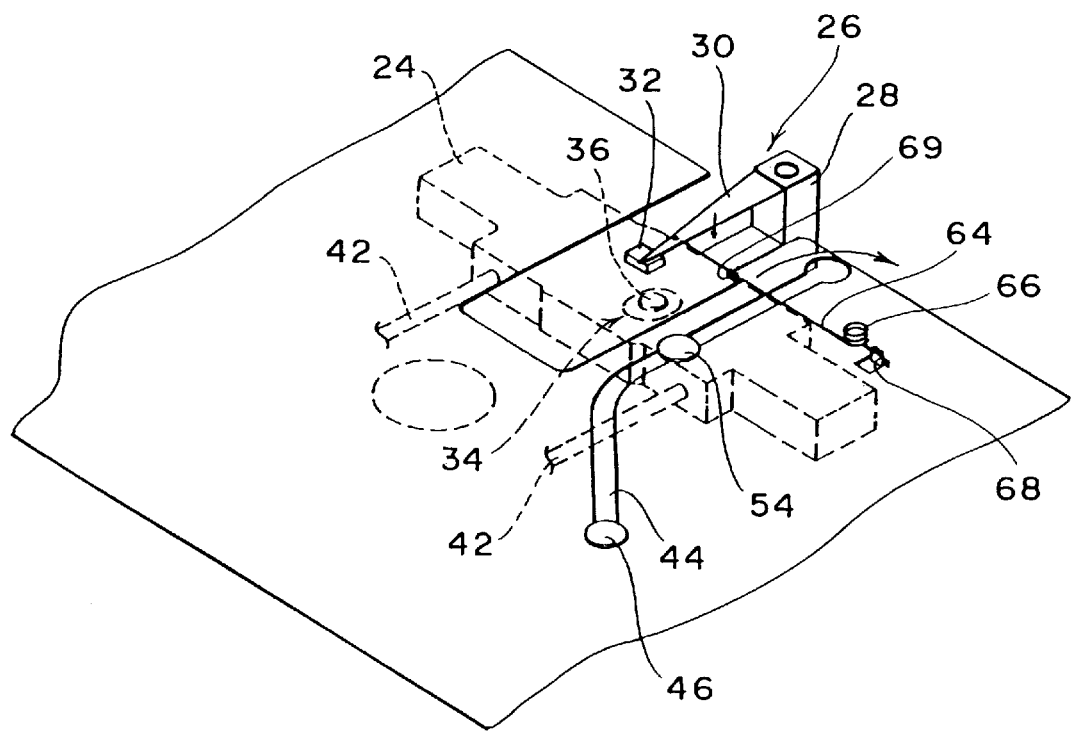
FIG. 4 is a perspective view of an essential part of the disk drive shown in FIG. 2.
Figure 5:
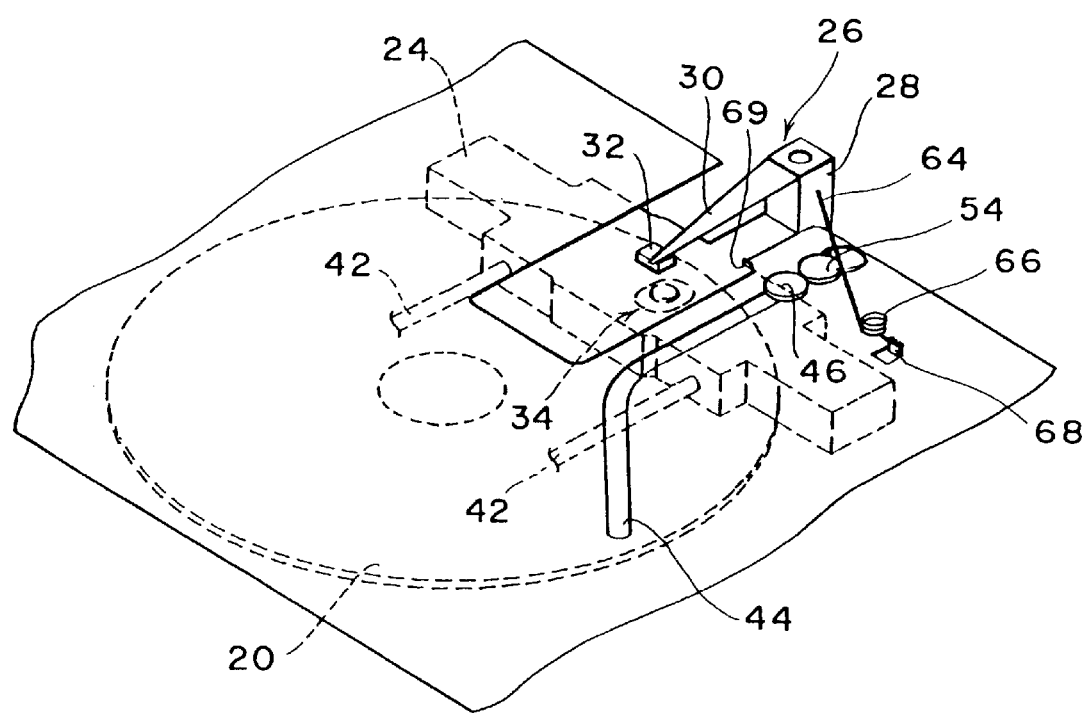
FIG. 5 is a view similar to FIG. 4, showing the condition shown in FIG. 3.
Figure 6:
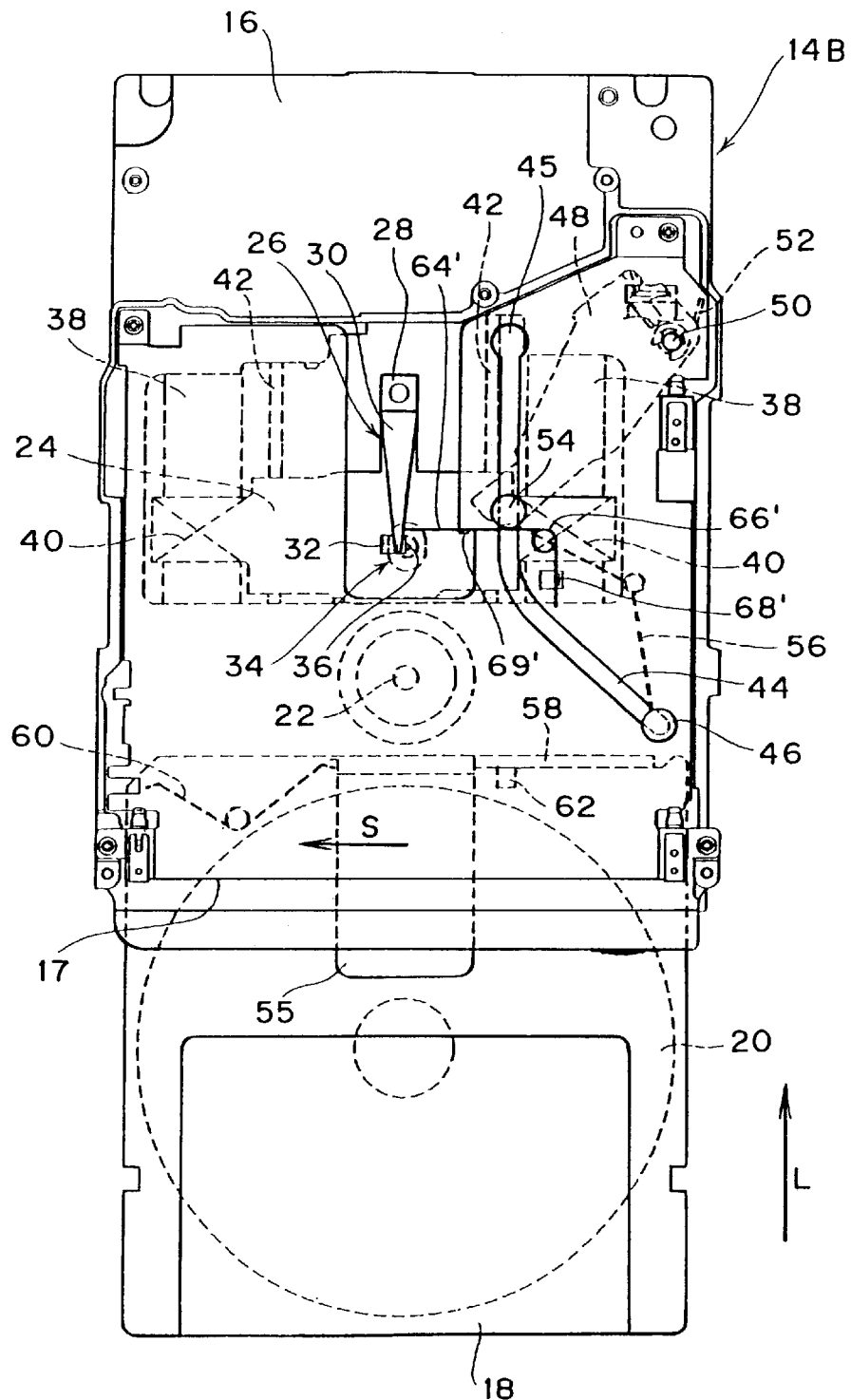
FIG. 6 is a plan view of a disk drive according to a second preferred embodiment of the present invention in a condition where a disk cartridge has started to be inserted into the disk drive.
Figure 7:
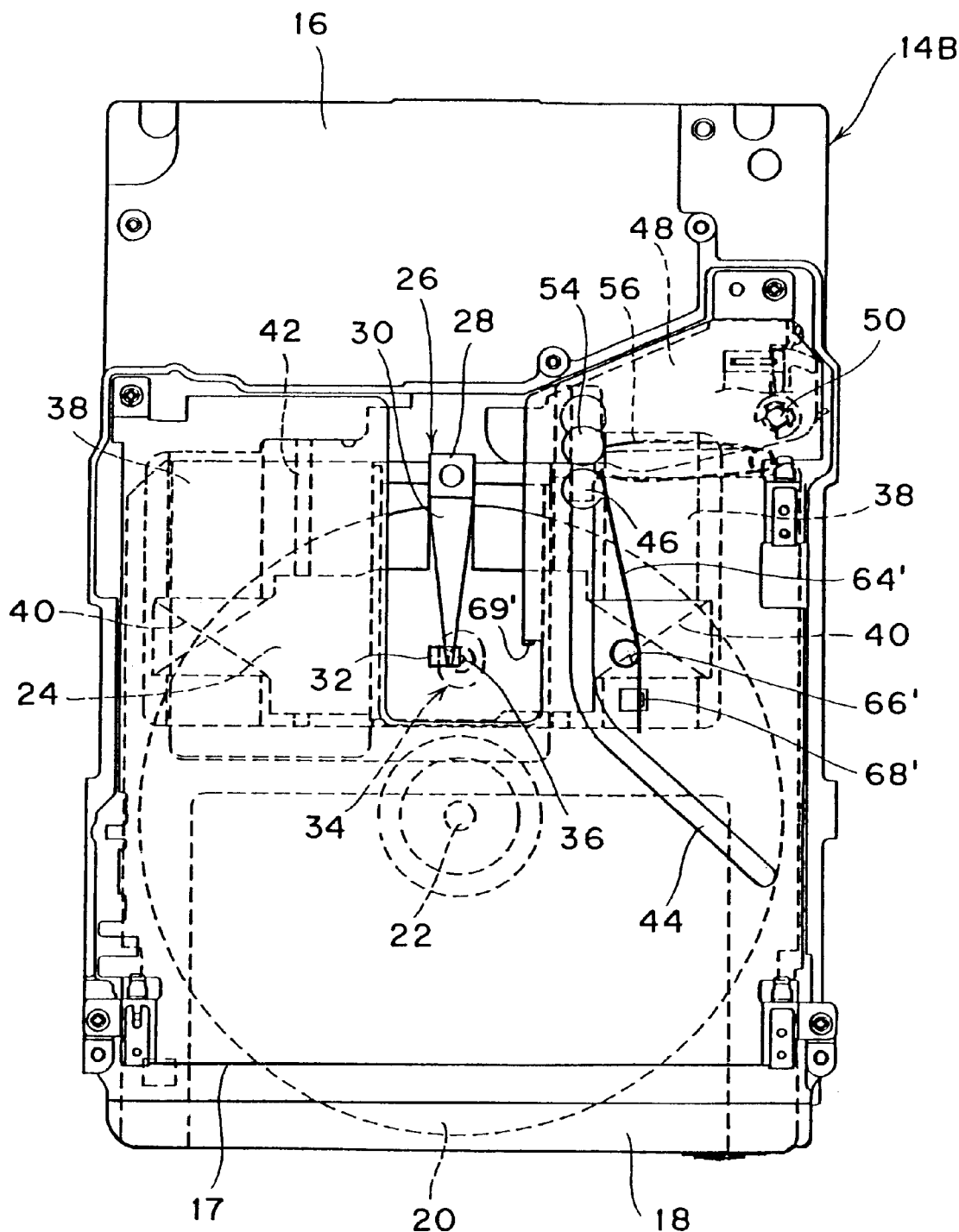
FIG. 7 is a view similar to FIG. 6, showing a condition where the disk cartridge has been fully inserted in the disk drive.
Figure 8:
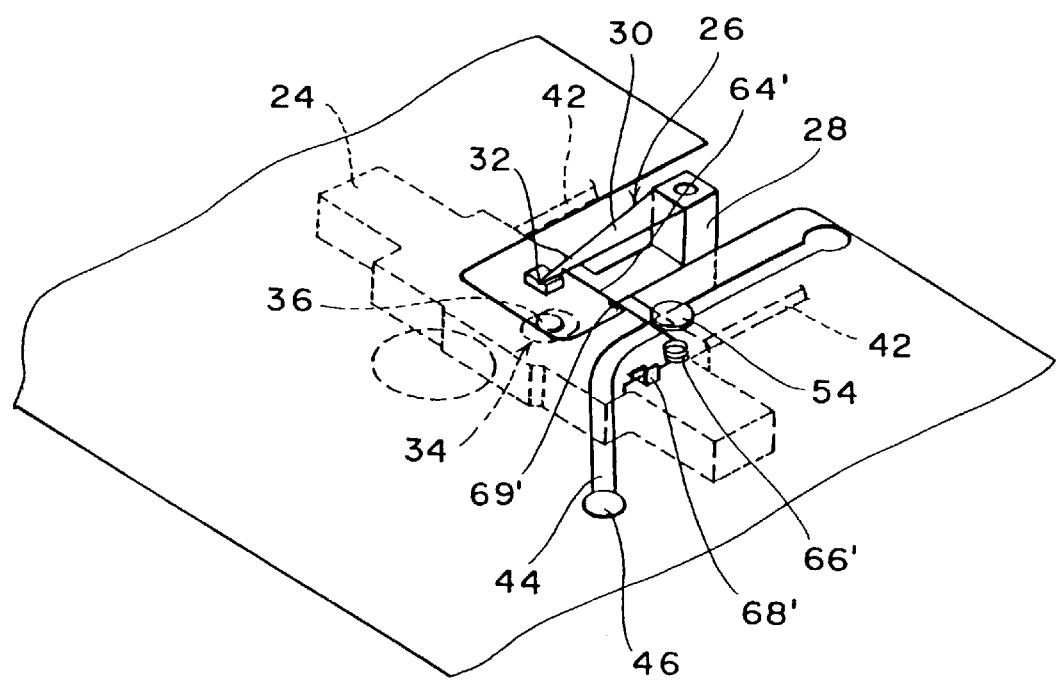
FIG. 8 is a perspective view of an essential part of the disk drive shown in FIG. 6.
Figure 9:
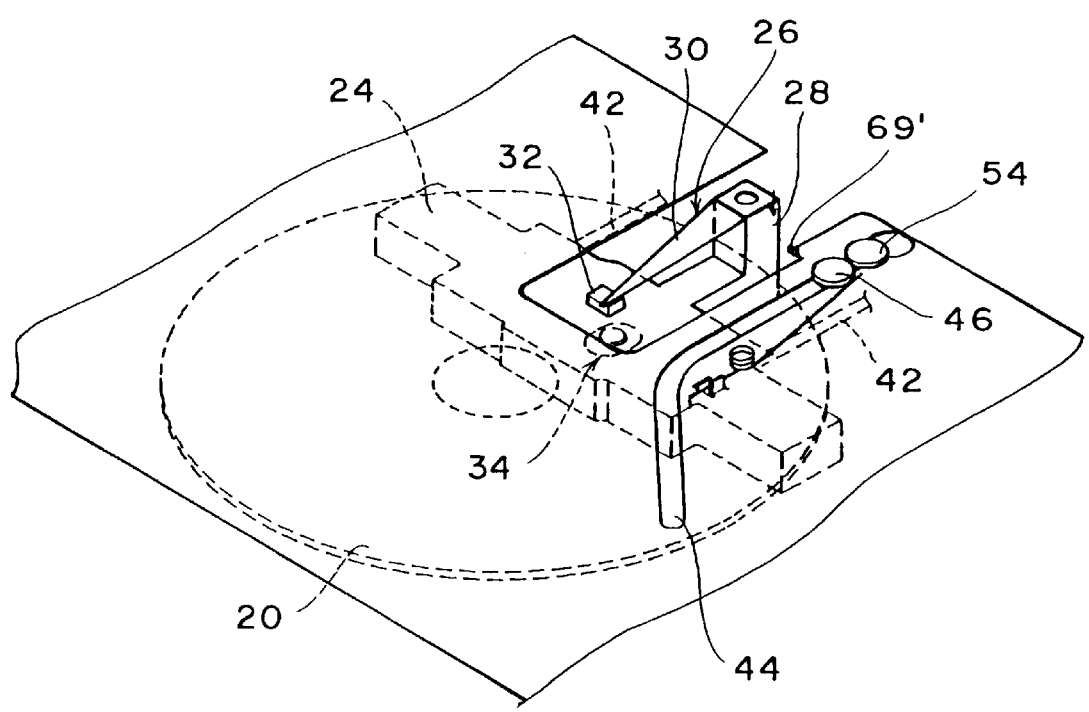
FIG. 9 is a view similar to FIG. 8, showing the condition shown in FIG. 7.

Reference numeral 26 denotes a magnetic head assembly. As shown in FIGS. 4 and 5, the magnetic head assembly 26 is composed of a head arm 28 fixed to the carriage 24, a suspension 30 fixed at its base end portion to the head arm 28, and a magnetic head 32 supported to a front end portion of the suspension 30.

The disk cartridge 18 has a shutter 55 movable in the direction of an arrow S shown in FIG. 2 and a shutter opening member 58 fixed at its one end to the shutter 55. A shutter spring 60 is engaged at its one end with the shutter 55 and engaged at the other end with the cartridge 18. The cartridge 18 is formed with a notch 62. When the cartridge 18 is inserted or loaded into the magneto-optical disk drive 14A in the direction of an arrow L shown in FIG. 2, the shutter 55 is opened to expose the magneto-optical disk 20. Accordingly, the magneto-optical disk drive 14A necessarily has a mechanism for opening and closing the shutter 55 and a mechanism for ejecting the cartridge 18.

That is, the magneto-optical disk drive 14A has a cartridge holder 17 for receiving the cartridge 18. The cartridge holder 17 is formed with a guide groove 44. The guide groove 44 has an enlarged circular portion 45 at one end thereof. Two rollers 46 and 54 are inserted from the enlarged circular portion 45 into the guide groove 44 so as to be movable therealong. An eject arm 48 is mounted on the cartridge holder 17 so as to be pivotable about a shaft 50. The eject arm 48 is normally biased counterclockwise as viewed in FIG. 2 by a coil spring 52. The roller 54 is slidably and rotatably inserted in an elongated hole (not shown) of the eject arm 48. Reference numeral 56 denotes a cartridge eject spring having one end fixed to the roller 46 and the other end fixed to the roller 54.

In operation, when the cartridge 18 is inserted into the magneto-optical disk drive 14A in the direction L shown in FIG. 2, the roller 46 engages the shutter opening member 58 to move along an inclined portion 44a of the guide groove 44. During this movement, the shutter 55 is opened in the direction S against a biasing force of the shutter spring 60. When the roller 46 comes to a longitudinally elongated straight portion 44b of the guide groove 44, the roller 46 engages the notch 62 of the cartridge 18 to determine a full open condition of the shutter 55.

The cartridge 18 is further inserted into the magneto-optical disk drive 14A as the rollers 46 and 54 and the eject arm 48 are pushed until the full insertion condition shown in FIG. 3 is reached. At this time, a lock mechanism (not shown) for a spindle motor 22 present under the cartridge 18 is released, and the spindle motor 22 is raised to chuck the disk 20. When the disk 20 is rotated by the spindle motor 22, the magnetic head 32 flies from the disk 20 at a given height by an air flow due to rotation of the disk 20, thus obtaining a condition where information can be recorded and reproduced.

In recording information, both the semiconductor laser (LD) 35 and the magnetic head 32 are driven. A laser beam emitted from the semiconductor laser 35 in the direction of an arrow B in FIG. 3 is reflected in a direction perpendicular to the sheet plane of FIG. 3 by a beam raising mirror (not shown) and next focused onto the disk 20 by the objective lens 36. At this time, an external magnetic field is applied by the magnetic head 32 (magnetically modulated) to thereby form a recording pit (recording mark) on the disk 20. When a current is supplied to the pair of coils 40 in recording or reproducing information, the carriage 24 is moved to seek a target track on the disk 20.

In ejecting the cartridge 18 from the magneto-optical disk drive 14A, the spindle motor 22 is lowered by a mechanical or electrical mechanism (not shown). As a result, the eject arm 48 is pivotally moved counterclockwise by the biasing force of the coil spring 50 to thereby eject the cartridge 18 from the magneto-optical disk drive 14A. At this time, the roller 46 is returned to its original position shown in FIG. 2 by the cartridge eject spring 56. Further, the shutter 55 is closed by the shutter spring 60.

Reference numeral 64 denotes a magnetic head lifter formed of spring steel. The magnetic head lifter 64 is partially coiled at 64a around a shaft 66 fixed to the cartridge holder 17. The magnetic head lifter 64 normally abuts at its uncoiled portion 64b against stoppers 68 and 69 by exerting a spring force as shown in FIG. 2. As best shown in FIG. 4, the magnetic head lifter 64 in this position is engaged with the suspension 30 to keep the magnetic head 32 sufficiently lifted from the surface of the disk 20 against the biasing force of the suspension 30. When the shutter 55 of the cartridge 18 is fully opened and the cartridge 18 is thereafter further inserted into the magneto-optical disk drive 14A, the side surface of the roller 54 pushes the magnetic head lifter 64 to pivotally move it around the shaft 66 clockwise as shown in FIG. 3.

In concert with the clockwise movement of the magnetic head lifter 64, the magnetic head 32 is gradually lowered onto the disk 20 by the biasing force of the suspension 30. More specifically, even after the magnetic head 32 is lowered to reach the surface of the disk 20, the cartridge 18 is further inserted in a slight amount, so that the magnetic head 32 slightly slides on the surface of the disk 20. However, the magnetic head 32 does not strike the surface of the disk 20 unlike the prior art. In ejecting the cartridge 18 from the magneto-optical disk drive 14A, the magnetic head lifter 64 is returned to its original position shown in FIG. 2 by its spring force, and the one end of the magnetic head lifter 64 comes into engagement with the suspension 30 to lift the magnetic head 32.

In this preferred embodiment, the loading and unloading operations of the magnetic head 32 with respect to the disk 20 are performed at an outermost circumferential portion of the disk 20. Accordingly, in ejecting the cartridge 18, a back electromotive force of the spindle motor 22 is applied to the coils 40 of the voice coil motor for moving the carriage 24 to retract the carriage 24 to the outermost circumferential portion of the disk 20.

FIGS. 6 to 9 show a magneto-optical disk drive 14B according to a second preferred embodiment of the present invention. In this preferred embodiment, the loading and unloading operations of the magnetic head 32 are performed at an innermost circumferential portion of the disk 20. The other configuration of this preferred embodiment is similar to that of the first preferred embodiment. By performing the loading and unloading operations of the magnetic head 32 with respect to the disk 20 at the outermost circumferential portion of the disk 20 as in the first preferred embodiment or at the innermost circumferential portion of the disk 20 as in the second preferred embodiment, an area where the magnetic head 32 contacts a data zone of the disk 20 can be reduced to thereby improve the reliability.

Figure 10:
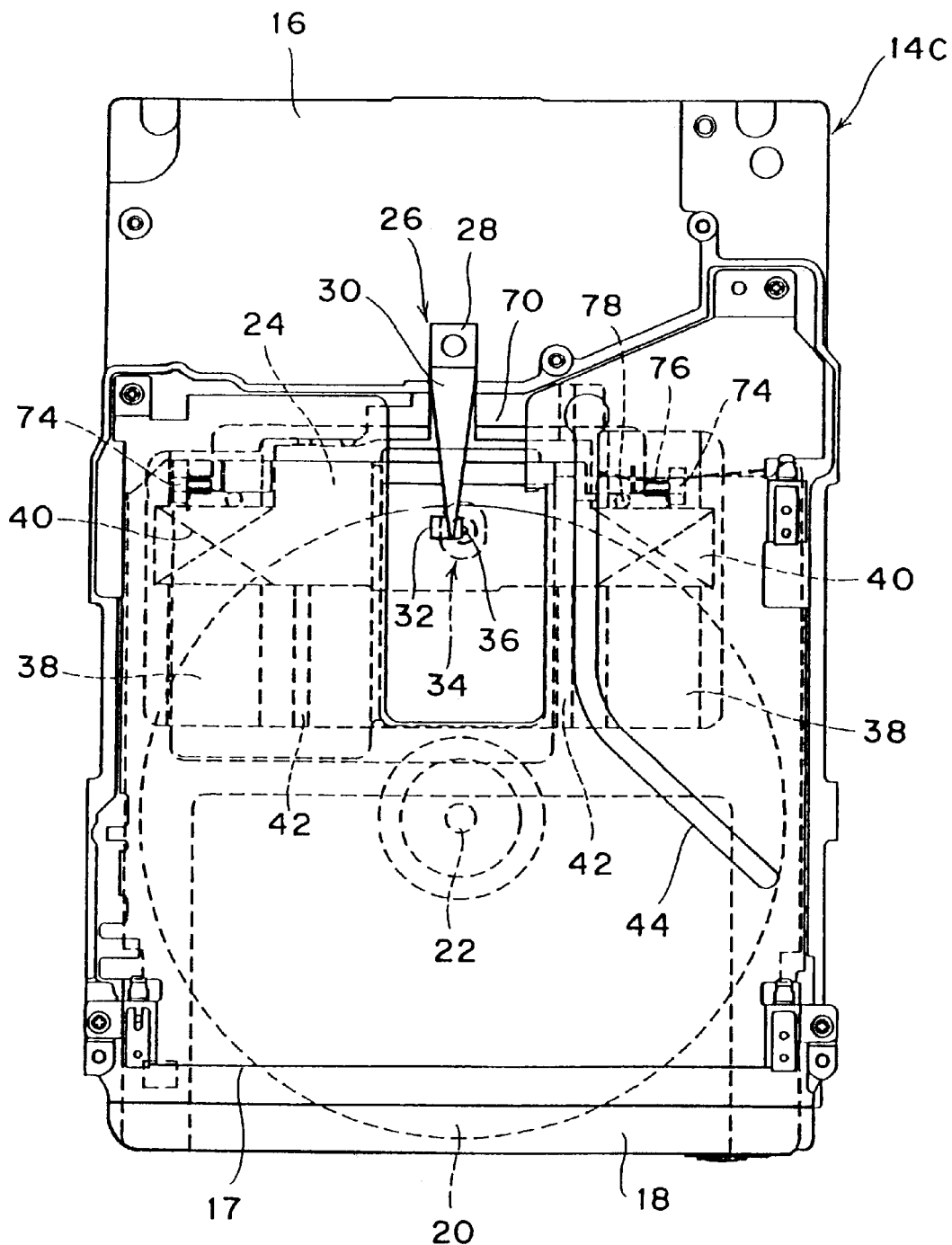
FIG. 10 is a plan view of a disk drive according to a third preferred embodiment of the present invention in a condition where a disk cartridge has been fully inserted in the disk drive.
Figure 11:
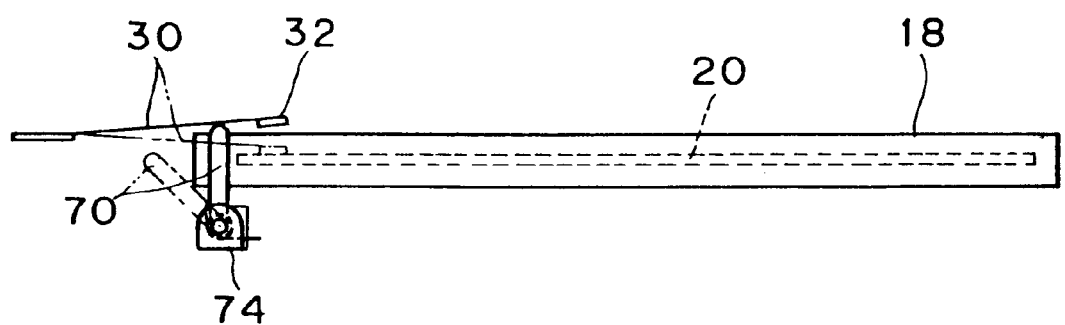
FIG. 11 is a side view showing the operation of a magnetic head lifter in the disk drive shown in FIG. 10.
Figure 12:
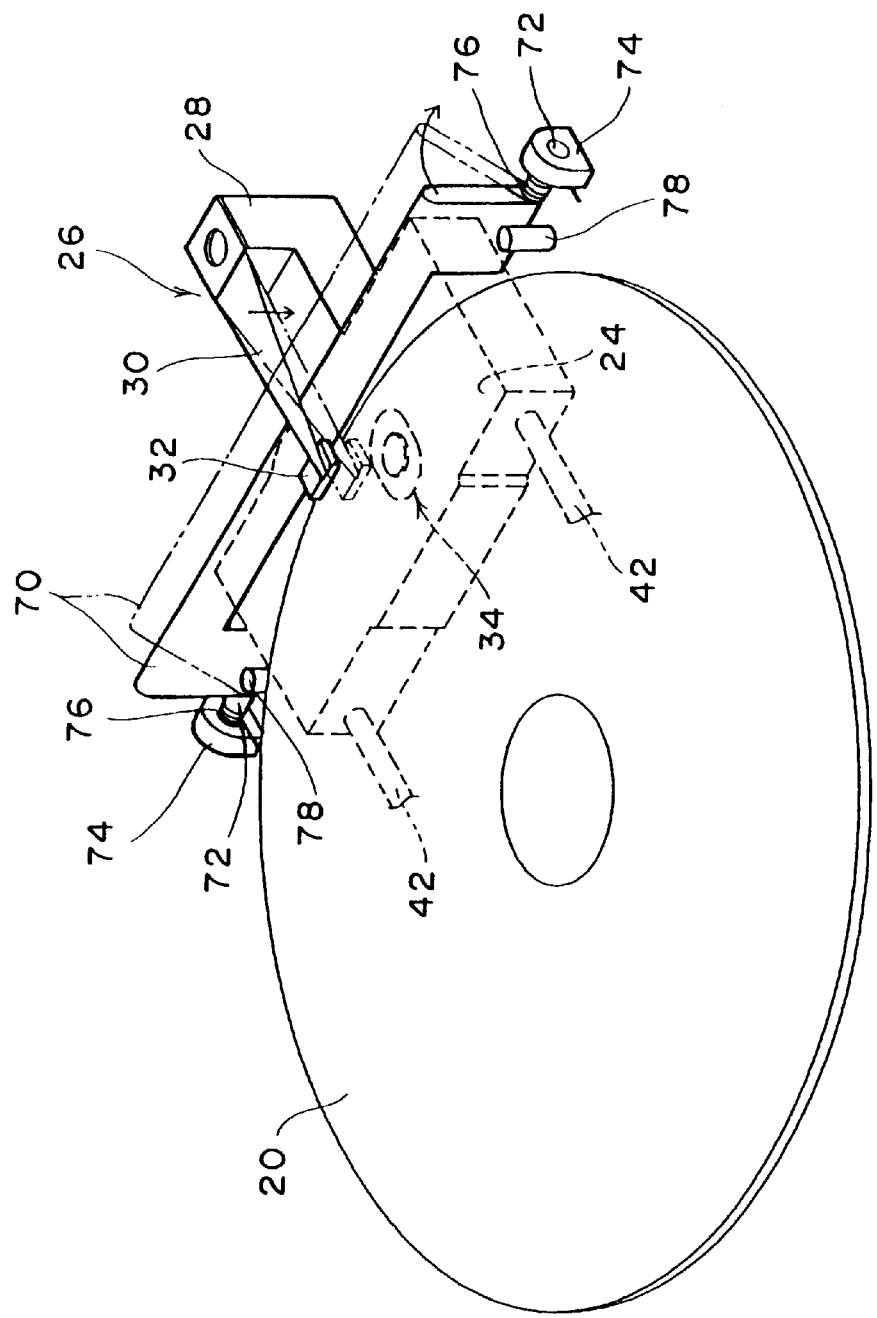
FIG. 12 is a perspective view of an essential part of the disk drive shown in FIG. 10.

FIG. 10 is a plan view of a magneto-optical disk drive 14C according to a third preferred embodiment of the present invention, FIG. 11 is a side view of FIG. 10, and FIG. 12 is a perspective view of an essential part of the magneto-optical disk drive 14C. As best shown in FIG. 12, reference numeral 70 denotes a magnetic head lifter formed from a resin molded member. The magnetic head lifter 70 is pivotably supported by a pair of bushings 74 fixed to the drive base 16.

That is, a pair of shafts 72 fixed to a lower end portion of the magnetic head lifter 70 are rotatably inserted in the pair of bushings 74, and a pair of coil springs 76 are mounted on the pair of shafts 72 to normally bias the magnetic head lifter 70 counterclockwise as viewed in FIG. 12 and urge it against a pair of stoppers 78. In this position, the magnetic head lifter 70 is engaged with the suspension 30 to keep the magnetic head 32 lifted from the surface of the disk 20.

When the cartridge 18 is inserted into the magneto-optical disk drive 14C, a front end of the cartridge 18 lowers the magnetic head lifter 70 to gradually lower the magnetic head 32 and finally allow contact of the magnetic head 32 and the disk 20. In ejecting the cartridge 18 from the magneto-optical disk drive 14C, the magnetic head lifter 70 is raised to a position when it abuts against the stoppers 78 by the coil springs 76, thereby lifting the magnetic head 32.

Figure 13:
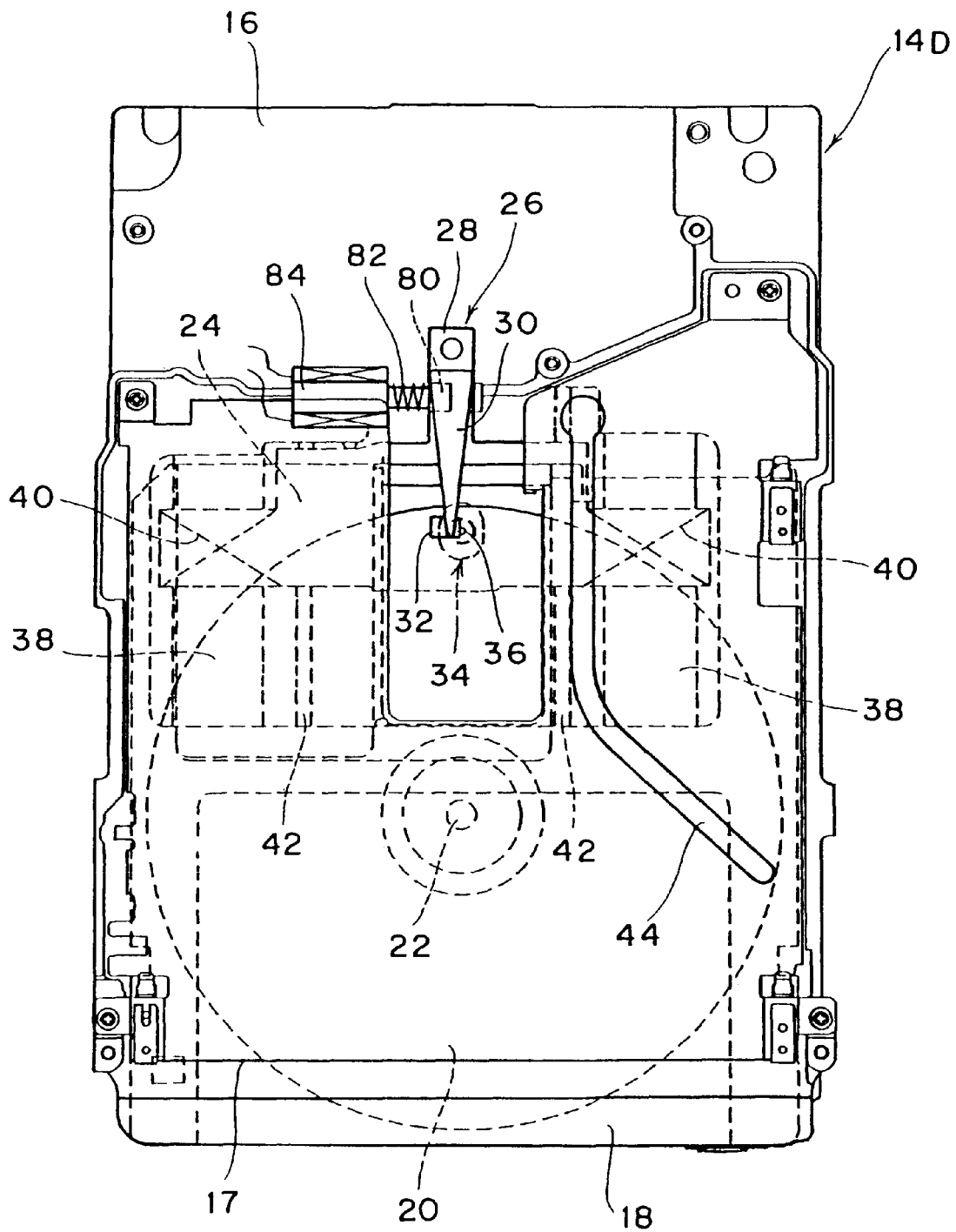
FIG. 13 is a plan view of a disk drive according to a fourth preferred embodiment of the present invention in a condition where a disk cartridge has been fully inserted in the disk drive.
Figure 14:
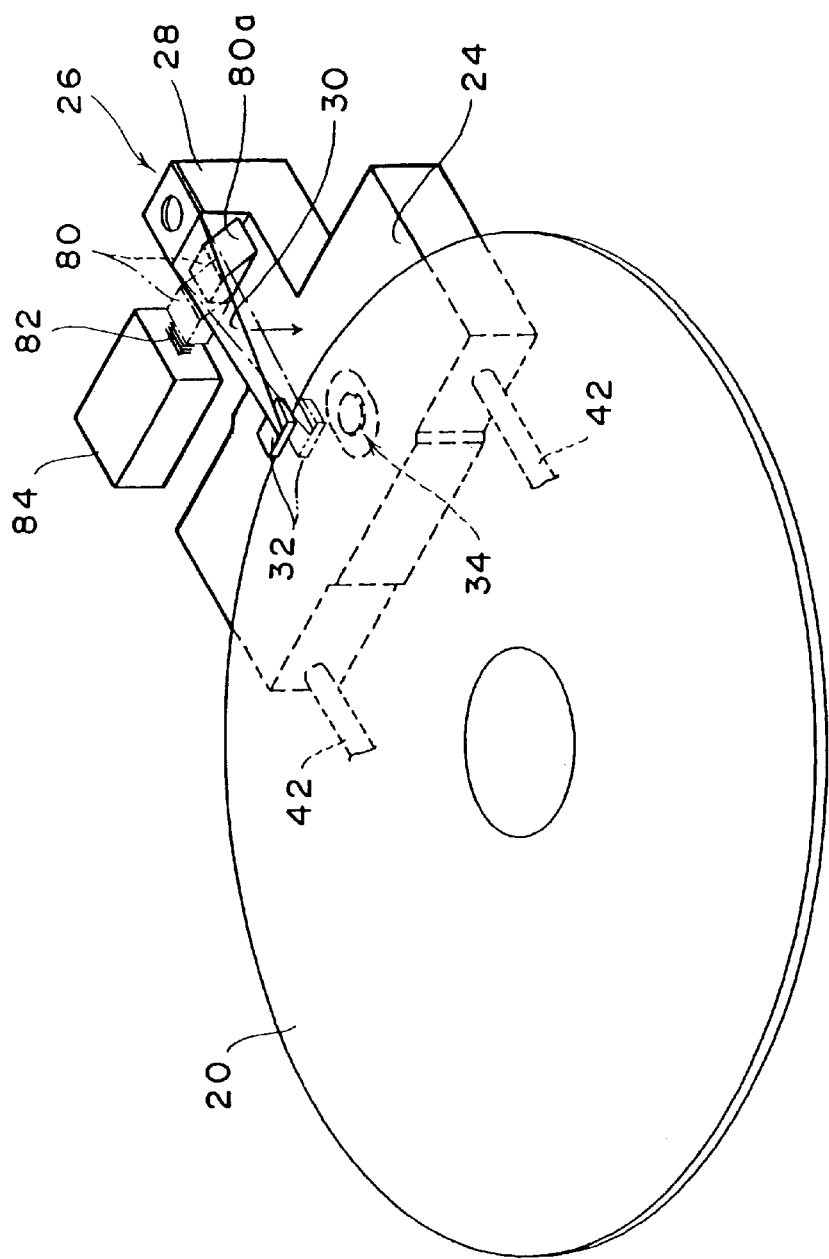
FIG. 14 is a perspective view of an essential part of the disk drive shown in FIG. 13.
Figure 15A:
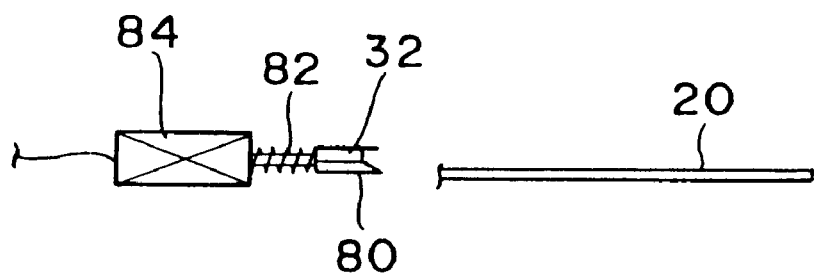
FIGS. 15A and 15B are side views showing the operation of a magnetic head lifter in the disk drive shown in FIG. 13.
Figure 15B:
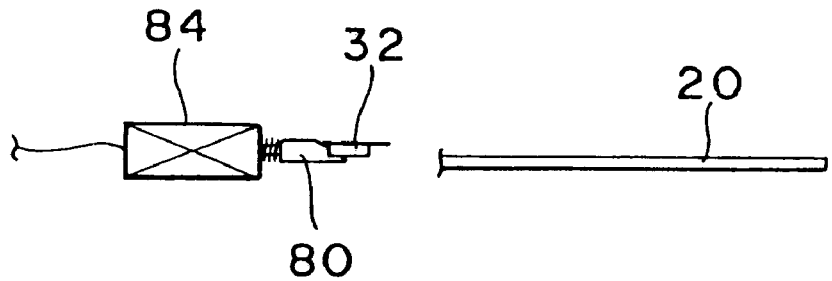

FIG. 13 is a plan view of a magneto-optical disk drive 14D according to a fourth preferred embodiment of the present invention, and FIG. 14 is a perspective view of an essential part of the magneto-optical disk drive 14D. As best shown in FIG. 14, reference numeral 80 denotes a magnetic head lifter. The magnetic head lifter 80 is connected to a solenoid 84. The magnetic head lifter 80 has an inclined surface 80a at a front end. Normally or in a deenergized condition of the solenoid 84, the magnetic head lifter 80 is biased by a coil spring 82 interposed between the magnetic head lifter 80 and the solenoid 84 to a projected position shown in FIG. 15A where the magnetic head lifter 80 is engaged with the suspension 30 to keep the magnetic head 32 lifted from the surface of the disk 20. When the solenoid 84 is energized, the magnetic head lifter 80 is drawn to the solenoid 84 against a biasing force of the coil spring 82 as shown in FIG. 15B, so that the magnetic head 32 is lowered and allowed to come into contact with the surface of the disk 20.

When the power of the magneto-optical disk drive 14D is off or the cartridge 18 is not inserted in the magneto-optical disk drive 14D, the magnetic head 32 is normally kept lifted by the magnetic head lifter 80. When the cartridge 18 is inserted into the magneto-optical disk drive 14D and the power of the disk drive 14D is turned on, the spindle motor 22 is first rotated and the solenoid 84 is next energized after a given period of time. Accordingly, the magnetic head lifter 80 is drawn by the solenoid 84 to disengage from the suspension 30, so that the magnetic head 32 is lowered. At this time, a flying force by the rotation of the disk 20 has already been applied to the magnetic head 32 to keep the magnetic head 32 flying, thereby avoiding the magnetic head 32 from striking the disk 20. In recording or reproducing information, the solenoid 84 is always kept energized.

In turning off the power of the magneto-optical disk drive 14D or ejecting the cartridge 18 from the disk drive 14D, the carriage 24 is first retracted to a given position similar to the first preferred embodiment, and the solenoid 84 is next deenergized. Then, the power of the magneto-optical disk drive 14D is turned off or the cartridge 18 is ejected from the disk drive 14D. When the solenoid 84 is deenergized, the magnetic head lifter 80 is returned to the projected position by the biasing force of the coil spring 82 to lift the magnetic head 32 again. Accordingly, even when the cartridge 18 is ejected or the power of the magneto-optical disk drive 14D is turned off in this condition, there is no possibility that the magnetic head 32 may interfere with the disk 20.

As shown in FIG. 14, the solenoid 84 has a magnetic circuit parallel to the disk 20, thereby allowing a reduction in thickness of the disk drive. Furthermore, according to this preferred embodiment, the magnetic head 32 is kept lifted from the disk 20 at starting the spindle motor 22, so that a starting torque for the spindle motor 22 can be reduced.

Figure 16:
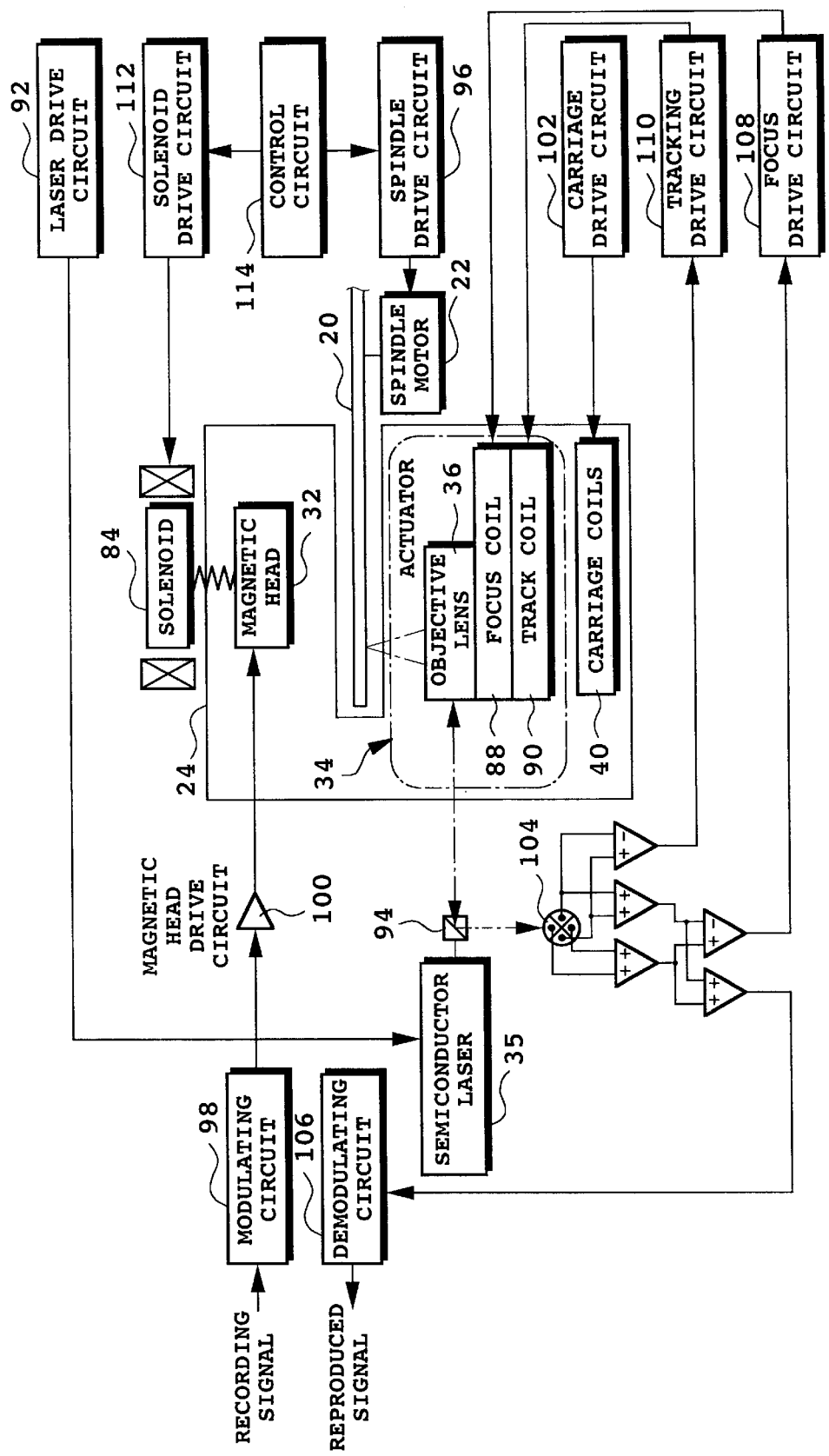
FIG. 16 is a block diagram of control for the disk drive shown in FIG. 13.

The control operation of the fourth preferred embodiment will now be described with reference to FIG. 16 showing a block diagram of control for the disk drive. The spindle motor 22 is driven by a spindle drive circuit 96 to rotate the magneto-optical disk 20 at a high speed. The semiconductor laser 35 is driven by a laser drive circuit 92 to emit a laser beam having a constant intensity. The laser beam is transmitted through a beam splitter 94 and next focused onto the magneto-optical disk 20 by the objective lens 36. A recording signal is input into a modulating circuit 98, which in turn drives a magnetic head drive circuit 100 according to the recording signal. The magnetic head drive circuit 100 drives the magnetic head 32 to apply an external magnetic field modulated with the recording signal to the magneto-optical disk 20. As a result, a recording pit according to the recording signal is formed in a beam spot on the magneto-optical disk 20.

In reading data recorded on the magneto-optical disk 20, the magnetic head 32 is not used. That is, the semiconductor laser 35 is driven by the laser drive circuit 92 to emit a laser beam having a reproducing power weaker than a recording power. The laser beam is focused on the magneto-optical disk 20 by the objective lens 36, and a reflected beam from the disk 20 is input through the objective lens 36 and the beam raising mirror (not shown) into the beam splitter 94. The input beam is next reflected by the beam splitter 94 and received by a four-divided photodetector 104.

The reflected light from the magneto-optical disk 20 changes in its magnetic Kerr rotation according to the recorded data. Accordingly, by demodulating the magnetic Kerr rotation in a demodulating circuit 106, a reproduced signal is obtained. The light detected by the four-divided photodetector 104 is converted into electrical signals according to the light quantity input. The electrical signals are next input through an adder and a comparator into a focus drive circuit 108, which in turn supplies a current to a focus coil 88 according to an error signal, thereby moving the objective lens 36 in a direction perpendicular to the disk 20.

The error signals from the four-divided photodetector 104 are also input through a comparator into a tracking drive circuit 110, which in turn supplies a current to a track coil 90 according to an error signal, thereby moving the optical head 34 in a desired direction. Further, a carriage drive circuit 102 supplies a current having a given direction and a given intensity to the carriage coils 40, thereby moving the carriage 24 in the radial direction of the disk 20 to seek a target track.

In this preferred embodiment, the order of driving of the spindle motor 22 and the solenoid 84 is important. That is, the spindle drive circuit 96 for driving the spindle motor 22 and a solenoid drive circuit 112 for driving the solenoid 84 are controlled by a control circuit 114 so that when the cartridge 18 is inserted into the magneto-optical disk drive 14D and the disk drive 14D is powered on, the spindle motor 22 is first rotated and the solenoid 84 is next energized after a given period of time. Conversely, the control circuit 114 controls the solenoid drive circuit 112 and the spindle drive circuit 96 so that when the magneto-optical disk drive 14D is powered off or the cartridge 18 is ejected from the disk drive 14D, the solenoid 84 is first deenergized and the spindle motor 22 is next stopped in rotation.

Figure 17:
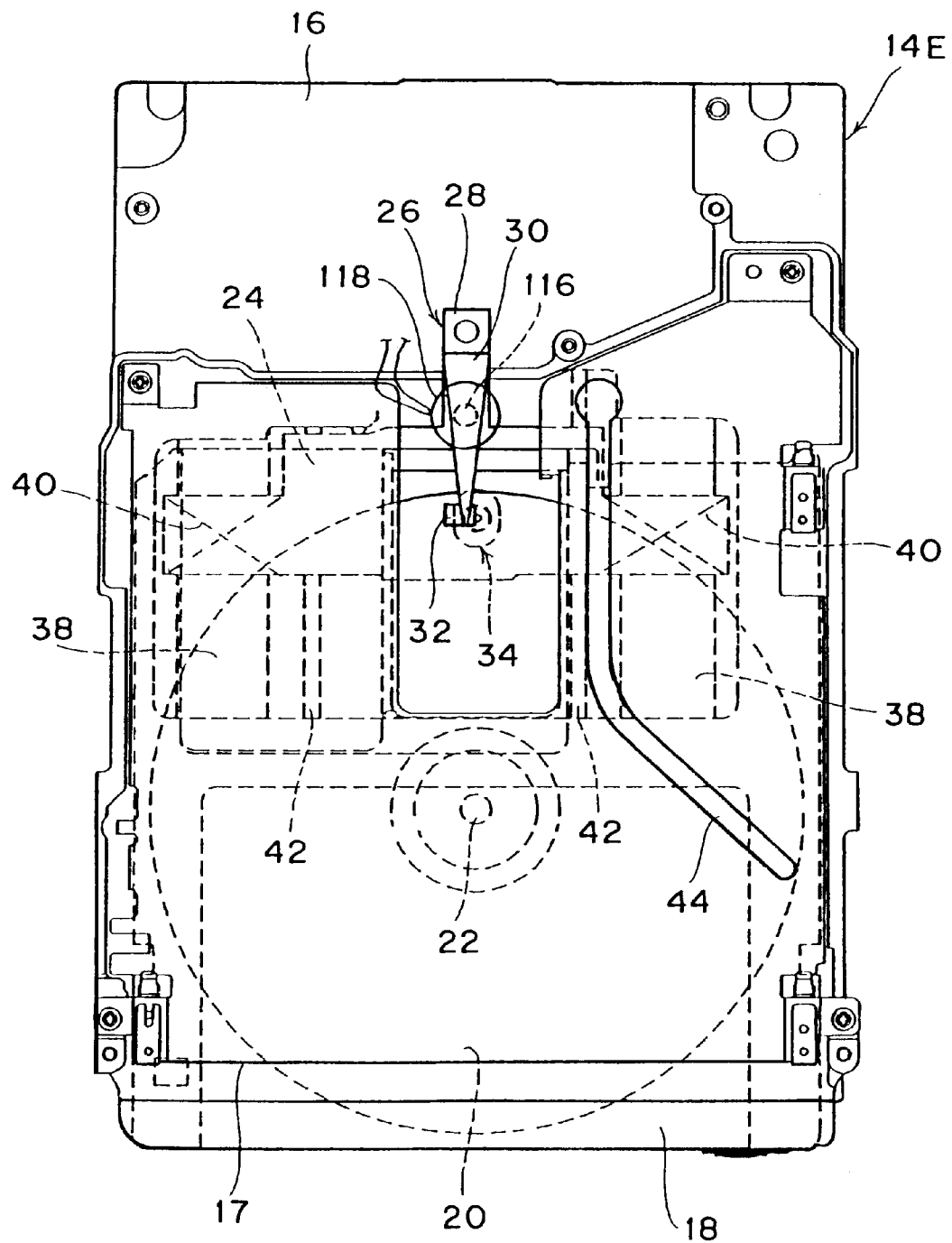
FIG. 17 is a plan view of a disk drive according to a fifth preferred embodiment of the present invention in a condition where a disk cartridge has been fully inserted in the disk drive.
Figure 18A:
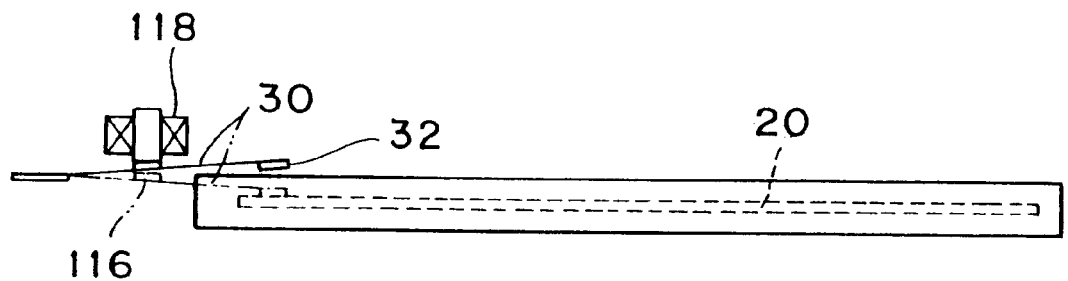
FIG. 18A is a side view showing the operation of a magnetic head lifter in the disk drive shown in FIG. 17.

Referring to FIG. 17, there is shown a plan view of a magneto-optical disk drive 14E according to a fifth preferred embodiment of the present invention. As shown in FIG. 18A which is a side view of an essential part of the magneto-optical disk drive 14E, a permanent magnet 116 is mounted on the suspension 30, and a solenoid 118 opposed to the permanent magnet 116 is mounted on the drive base 16. When the power of the magneto-optical disk drive 14E is off or the cartridge 18 is not inserted in the disk drive 14E, the permanent magnet 116 is attracted to an iron core 120 of the solenoid 118 as shown by a solid line in FIG. 18B, thereby keeping the magnetic head 32 lifted from the surface of the disk 20.

Figure 18B:
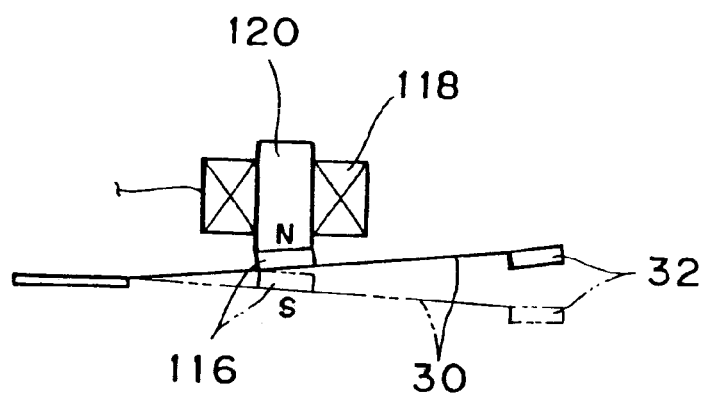
FIG. 18B is an enlarged view of an essential part in FIG. 18A.

When the cartridge 18 is inserted into the magneto-optical disk drive 14E and the disk drive 14E is powered on, the spindle motor 22 first starts to be rotated. Assuming that the polarity of the permanent magnet 116 is set as shown in FIG. 18B, a current is instantaneously passed through the solenoid 118 so that an end portion of the iron core 120 opposed to the permanent magnet 116 becomes an N pole. Accordingly, the permanent magnet 116 is repelled from the iron core 120 to lower the magnetic head 32. Thereafter, the current supplied to the solenoid 118 may be cut off, because the biasing force of the suspension 30 and the flying force by the rotation of the disk 20 are balanced with each other, thereby keeping the magnetic head 32 flying at a given height from the disk 20.

In turning off the power of the magneto-optical disk drive 14E or ejecting the cartridge 18 from the disk drive 14E, the carriage 24 is first retracted to a given position similar to the fourth preferred embodiment, and a back electromotive force of the spindle motor 22 is then instantaneously applied to the solenoid 118 so that the end portion of the iron core 120 opposed to the permanent magnet 116 becomes an S pole, thereby attracting the permanent magnet 116 to the iron core 120. Even after the back electromotive force is cut off, the magnetic head 32 is kept lifted from the disk 20 by the magnetic attraction of the permanent magnet 116 and the iron core 120. In this condition, rotation of the spindle motor 22 is stopped.

According to this preferred embodiment, the solenoid 118 is instantaneously energized only when loading or unloading the magnetic head 32 with respect to the disk 20. Accordingly, power consumption can be reduced as compared with the fourth preferred embodiment. As a modification of this preferred embodiment, a solenoid and iron core so large as to cover the whole operating range of the magnetic head 32 may be located. In this case, the position of the carriage 24 at starting or ending the flying of the magnetic head 32 is not limited.

According to the present invention, it is possible to provide a disk drive with a simple mechanism for loading and unloading a magnetic head with respect to a disk without damaging the disk and the magnetic head. According to the fourth or fifth preferred embodiment of the present invention, it is possible to provide a disk drive which can reduce a static frictional force between the magnetic head and the disk to thereby reduce a load to the spindle motor. According to the fifth preferred embodiment of the present invention, it is sufficient to instantaneously supply power to means for lifting and lowering the magnetic head only when loading or unloading the magnetic head with respect to the disk, thereby reducing power consumption of the disk drive.

What is claimed is:

1. A disk drive adapted to accept and eject a disk cartridge accommodating a disk, comprising:

a drive base;

a carriage mounted on said drive base so as to be movable in a radial direction of the disk;

driving means for moving said carriage;

a magnetic head assembly mounted on said carriage and having a magnetic head;

cartridge ejecting means having an eject arm pivotally movable in a first direction when the disk cartridge is inserted into said disk drive, and pivotally movable in a second direction opposite to said first direction when the disk cartridge is ejected from said disk drive;

a magnetic head lifter including an end portion, said magnetic head lifter being pivotally movable about an axis defined through said end portion between a first position where said magnetic head lifter engages said magnetic head assembly to lift said magnetic head and a second position where said magnetic head lifter is pushed by an insertion force of the disk cartridge inserted into said disk drive to disengage said magnetic head lifter from said magnetic head assembly and allow contact of said magnetic head with the disk when the disk cartridge is accepted in said disk drive, wherein when moving from said first position to said second position, said magnetic head lifter slides along said magnetic head assembly, in a direction generally away from said magnetic head, so that said magnetic head gradually approaches the disk; and biasing means for biasing said magnetic head lifter to said first position.

2. A disk drive according to claim 1, wherein said magnetic head assembly includes a head arm fixed to said carriage, a suspension fixed at a base end portion thereof to said head arm, and said magnetic head mounted on a front end portion of said suspension, said magnetic head lifter selectively engaging said suspension to lift said magnetic head at said first position.

3. A disk drive according to claim 1, wherein loading and unloading of said magnetic head with respect to said disk are performed at an outermost circumferential portion of the disk when the disk is accepted in said disk drive.

4. A disk drive according to claim 1, wherein loading and unloading of said magnetic head with respect to said disk are performed at an innermost circumferential portion of the disk when the disk is accepted in said disk drive.

5. A disk drive according to claim 1, further comprising an optical head mounted on said carriage and having an objective lens;

said objective lens and said magnetic head being opposed to each other with the disk interposed therebetween.

6. A disk drive as recited in claim 1, wherein said biasing means is at least one torsional spring.

7. The disk drive according to claim 1, wherein said axis defined through said end portion of said magnetic head lifter extends in a direction that is generally perpendicular to said drive base.

8. The disk drive according to claim 1, wherein said magnetic head lifter is formed of an elongated metal member that is partially coiled at said end portion.

9. A disk drive adapted to accept and eject a disk cartridge accommodating a disk, comprising:

a carriage movable in a radial direction of the disk;

driving means for moving said carriage;

a magnetic head assembly mounted on said carriage and having a magnetic head;

cartridge ejecting means having an eject arm pivotally movable in a first direction when the disk cartridge is inserted into said disk drive, and pivotally movable in a second direction opposite to said first direction when the disk cartridge is ejected from said disk drive;

a magnetic head lifter including an end portion, said magnetic head lifter being pivotally movable about an axis defined through said end portion between a first position where said magnetic head lifter engages said magnetic head assembly to lift said magnetic head and a second position where said magnetic head lifter is pushed by an insertion force of the disk cartridge inserted into said disk drive to disengage said magnetic head lifter from said magnetic head assembly and allow contact of said magnetic head with the disk when the disk cartridge is accepted in said disk drive, wherein when moving from said first position to said second position, said magnetic head lifter slides along said magnetic head assembly, in a direction generally away from said magnetic head, so that said magnetic head gradually approaches the disk; and biasing means for biasing said magnetic head lifter to said first position.

10. The disk drive according to claim 9, wherein said axis defined through said end portion of said magnetic head lifter extends in a direction that is generally perpendicular to the disk in a state when the disk cartridge is installed within the disk drive.

11. The disk drive according to claim 9, wherein said magnetic head lifter is formed of an elongated metal member that is partially coiled at said end portion.

12. A disk drive adapted to accept and eject a disk cartridge accommodating a disk, comprising:

a drive base;

a carriage mounted on said drive base so as to be movable in a radial direction of the disk;

driving means for moving said carriage;

a head arm fixed to said carriage;

a suspension fixed at a base end portion to said head arm;

a magnetic head mounted on a front end portion of said suspension;

cartridge ejecting means having an eject arm pivotally movable in a first direction when the disk cartridge is inserted into said disk drive, and pivotally movable in a second direction opposite to said first direction when the disk cartridge is ejected from said disk drive;

a magnetic head lifter pivotally movable between a first position where said magnetic head lifter engages said suspension to lift said magnetic head, and a second position where said magnetic head lifter is pushed by an insertion force of the disk cartridge inserted into said disk drive to allow contact of said magnetic head with the disk, wherein when moving from said first position to said second position, said magnetic head lifter slides longitudinally along said suspension, in a direction generally away from said magnetic head, so that said magnetic head gradually approaches the disk; and a coil spring for biasing said magnetic head lifter to said first position.

13. A disk drive according to claim 12, wherein said magnetic head lifter is integrally formed with said coil spring.

14. The disk drive according to claim 12, wherein said magnetic head lifter includes an end portion through which an axis is defined, and wherein said magnetic head lifter pivots about said axis.

15. The disk drive according to claim 14, wherein said axis defined through said end portion of said magnetic head lifter extends in a direction that is generally perpendicular to said drive base.

16. The disk drive according to claim 12, wherein said magnetic head lifter is formed of an elongated metal member that is partially coiled at one end portion thereof.

17. A disk drive adapted to accept and eject a disk cartridge accommodating a disk, comprising:

a drive base;

a cartridge holder mounted on said drive base;

a carriage mounted on said drive base so as to be movable in a radial direction of the disk;

driving means for moving said carriage;

a magnetic head assembly mounted on said carriage and having a magnetic head;

cartridge ejecting means having an eject arm pivotally movable in a first direction when the disk cartridge is inserted into said disk drive, and pivotally movable in a second direction opposite to said fist direction when the disk cartridge is ejected from said disk drive;

a guide groove formed on said cartridge holder;

a first slider movably engaged with said guide groove and adapted to come into contact with the disk cartridge;

a second slider movably engaged with said groove and slidably mounted on said eject arm;

a cartridge eject spring having one end engaged with said first slider and the other end engaged with said second slider; and a magnetic head lifter pivotally movable between a first position where said magnetic head lifter engages said magnetic head assembly to lift said magnetic head and a second position where said magnetic head lifter is pushed by an insertion force of the disk cartridge inserted into said disk drive to allow contact of said magnetic head with the disk.

18. A disk drive according to claim 17, wherein when the said disk cartridge is inserted into said disk drive, said magnetic head lifter is pushed by said second roller receiving the insertion force of the disk cartridge, so that said magnetic head lifter is pivotally moved to said second position.

* * * * *